US 6,587,622 B2

(12) United States Patent
Maroney et al.

(10) Patent No.: US 6,587,622 B2
(45) Date of Patent: Jul. 1, 2003

(54) ORIENTATION SWITCHABLE OPTICAL FIBRES

(75) Inventors: Andrew V Maroney, Epping (GB); Andrew L Reynolds, Bearsdon (GB); Kevin J Cordina, Bishops Stortford (GB)

(73) Assignee: Nortel Networks Limited, St. Laurent (CA)

( * ) Notice: Subject to any disclaimer, the term of this patent is extended or adjusted under 35 U.S.C. 154(b) by 34 days.

(21) Appl. No.: 10/006,472

(22) Filed: Dec. 4, 2001

(65) Prior Publication Data

US 2003/0103746 A1 Jun. 5, 2003

(51) Int. Cl.⁷ .................................................. G02B 6/26
(52) U.S. Cl. .............................. 385/41; 385/42; 385/16; 385/123
(58) Field of Search ............................... 385/16, 40–42, 385/123

(56) References Cited

U.S. PATENT DOCUMENTS 5,617,499 A * 4/1997 Brueck et al. .............. 385/122
6,215,935 B1 * 4/2001 Dagens et al. .............. 385/131
6,396,965 B1 * 5/2002 Anderson .................... 385/11
6,480,644 B1 * 11/2002 MacDonald ................. 385/16

* cited by examiner

Primary Examiner—Akm E. Ullah
Assistant Examiner—Jerry T. Rahll
(74) Attorney, Agent, or Firm—Barnes & Thornburg

(57) ABSTRACT

An orientation switchable optical fiber 1 has an elongate body 8 with two ends N, F. The body 8 is twisted intermediate the two ends at M and has a central core region 14 in which light carried by the fiber is confined. Passive means in the form of air channels 6 extend substantially from one end N to substantially the other end F of the body 8. The passive means 6 promotes orientation of light in at least one first transverse axis A of the body 8. Active means in the form of thermally stressable rods 10 extend substantially from the location of the twist M to substantially the other end F of the body 8. The active means 10 is switchable between an off state in which it is ineffective and an on state in which it is effective to promote orientation of light in at least one second transverse axis B of the body 8. In the off state of the active means 10 light remains confined in the at least one first axis A along the length of the body 8 and in the on state of the active means 10 light transits as on passing the location of the twist M from the first axis A to the at least one second axis B.

33 Claims, 3 Drawing Sheets

ORIENTATION SWITCHABLE OPTICAL FIBRES

FIELD OF THE INVENTION

The invention relates to orientation switchable optical fibres, otherwise known as in-fibre switches, for converting light in one orientation or polarisation to one of two or more possible orientations.

BACKGROUND OF THE INVENTION

In typical optical communications networks, modulated optical signals are transported by optical fibres. Within the network, usually at nodes or intersections, various signal processing operations are carried out. Certain processes require the polarisation or orientation of light in one or one of two or more particular axes. Examples of such processes are polarisation routing, polarisation control, PMD compensation, pump combination, detector optimisation and bit interleaving.

Conventional step-index optical fibres typically comprise a central core of relatively high refractive index material, surrounded by a cladding of relatively low refractive index material, encased in a protective jacket. Light is confined to the core by total internal reflection as a result of the step difference in refractive index between the core and the cladding.

In contrast, photonic crystal fibres (PCFs) comprise only one material which is provided with periodic features, generally air holes, surrounding a central, so-called defect. The periodic features define a lattice, and the fibre is characterised by the lattice pitch and the diameter of the periodic features.

In the case of solid core PCFs, the central defect has a relatively high refractive index in comparison to the surrounding material, whose effective refractive index is reduced as a result of the presence of the periodic features, so that, in a manner analogous to a step-index fibre, light is confined to the central defect. The defect may be provided by continuous material at the centre of the fibre and the periodic features by air holes in the same material. Thus, a solid core PCF has a central part of fibre material running the whole length of the fibre, and a lattice of regularly sized and spaced air channels also running the whole length of the fibre. Such PCFs are often known as holey fibres.

In optical communications networks, in-fibre switching would be advantageous because, at the least, it avoids the need for non-fibre switching entities in the network. The applicants are not aware of any communications network optical fibre which is provided with the means to switch light it is carrying from one orientation to another. In other words, the applicants do not know of any in-fibre switch currently available.

OBJECT OF THE INVENTION

An object of the invention to provide an optical fibre which is orientation switchable.

BRIEF DESCRIPTION OF THE INVENTION

According to a first aspect, the invention provides an orientation switchable optical fibre comprising an elongate body having two ends, which body is twisted intermediate the two ends, a central core region in which light carried by the fibre is confined, passive means extending substantially from one end to substantially the other end of the body, which passive means promotes orientation of the light in at least one first transverse axis of the body, active means extending substantially from the location of the twist to substantially the other end of the body, which active means is switchable between an off state in which the active means is ineffective and an on state in which the active means is effective to promote orientation of light in at least one second transverse axis of the body, wherein in the off state of the active means light remains confined in the at least one first axis along the length of the body and in the on state of the active means light transits as on passing the location of the twist from the first axis to the at least one second axis.

In the absence of a twist, the light would not transit from the at least one first axis to the at least one second axis as the light would never "see" the other axis. The twist is preferably through 90° although other angles of twist are equally applicable.

The body may be substantially circular in cross section and each at least one transverse axis may be diametrical axes. In the case of only one first axis and only one second axis, the two axes may be substantially orthogonal. Typically, the body would be of doped silica material.

The passive means preferably comprises a feature which reduces the effective refractive index of the body material surrounding the core region such that there is a step change in refractive index between the core region and the surrounding body material in the first axis. The feature may comprise air channels, in particular a pair of air channels, spaced apart to either side of the core region thereby to define the first transverse axis. The air channels are typically of micron to sub-micron diameters. Hence, the passive means and the core region behave in the manner of a micro-structured optical fibre, specifically a solid core PCF or holey fibre. The passive means may comprise a plurality of features each promoting orientation of light in one first transverse axis of the body.

The active means may comprise a switchable feature which is switchable between an off state in which it has no effect on the refractive index of the core region and an on state in which it has an effect on the refractive index of the core region in the second axis. Preferably, the effect is an increase in the refractive index of the core region, further preferably such that the step change in the refractive index between the core region and the surrounding body material in the second axis is greater than the step change in the refractive index in the first axis. The switchable feature may comprise rods of material, preferably a pair of rods of material, spaced apart to either side of the core region thereby to define the second transverse axis. The pair of rods may be switchable between an off state in which they are unstressed and an on state in which they are stressed thereby to affect the refractive index of the core region. The stress may be applied by means of heat, electricity or mechanical force. The material for the rods will depend upon how the stress is to be applied but, for example, for heat induced stress, the rods may be of quartz based silica design. The rods may be several microns in diameter. Also preferably, the stress is applied by means of contacts applied to the outer surface of the body. Resistive heating of contacts is one way of inducing heat in the rods but other methods, such as electrical switching and travelling wave switching, are other examples. The active means may comprise a plurality of switchable each, in the on state, promoting orientation of light in one second axis.

In an alternative embodiment, the invention provides an orientation switchable optical fibre largely as the first aspect except that active means extends along the whole length of the body such that, according to the state of the active means, there are two possible orientations for light along the whole length of the fibre with switching between each facilitated.

According to a second aspect, the invention provides an orientation switchable optical fibre comprising an elongate body having two ends, which body is twisted intermediate the two ends, a central core region in which light carried by the fibre is confined, passive means extending substantially from the first end of the body to substantially the location of the twist, which passive means promotes orientation of the light in at least one first transverse axis of the body, active means extending substantially from the location of the twist to substantially the second end of the body, which active means has a plurality of features each switchable between an off state in which the feature is ineffective and an on state in which the feature is effective to promote orientation of light in a corresponding transverse axis of the body, wherein one of the second transverse axes is substantially aligned with a first of the first transverse axes and wherein the on state of the one of the plurality of features corresponding to the said one second axis light remains confined in the first axis along the length of the body and in the on state of one of the other of the plurality of features light transits on passing the location of the twist from the first axis to the second axis corresponding to the said one other of the plurality of features.

According to a third aspect, the invention provides an optical signal processor including an orientation switchable optical fibre according to a first or second aspect of the invention.

According to a fourth aspect, the invention provides an optical communications system including an orientation switchable optical fibre according to a first or second aspect of the invention or a processor according to a third aspect of the invention.

According to a fifth aspect, the invention provides a method of switching light orientation in an optical fibre comprising an elongate body having two ends, which body is twisted intermediate the two ends, a central core region in which light carried by the fibre is confined, passive means extending substantially from one end to substantially the other end of the body, which passive means promotes orientation of the light in at least one first transverse axis of the body, active means extending substantially from the location of the twist to substantially the other end of the body, which active means is switchable between an off state in which the active means is ineffective and an on state in which the active means is effective to promote orientation of light in at least one second transverse axis of the body, the method comprising switching the active means between the off state in which light remains confined in the at least one first axis along the length of the body and the on state in which light transits on passing the location of the twist from the at least one first axis to the at least one second axis.

In an alternative embodiment, the invention provides a method of switching light orientation in an optical fibre largely as described immediately above except that active means extends along the whole length of the body such that, according to the state of the active means, there are two possible orientations for light along the whole length of the fibre with switching between each facilitated.

According to a sixth aspect, the invention provides a method of switching light orientation in an optical fibre comprising an elongate body having two ends, which body is twisted intermediate the two ends, a central core region in which light carried by the fibre is confined, passive means extending substantially from the first end of the body to substantially the location of the twist, which passive means promotes orientation of the light in at least one first transverse axis of the body, active means extending substantially from the location of the twist to substantially the second end of the body, which active means has a plurality of features each switchable between an off state in which the feature is ineffective and an on state in which the feature is effective to promote orientation of light in a corresponding transverse axis of the body, wherein one of the second transverse axes is substantially aligned with a first of the first transverse axes, the method comprising switching one of the plurality of features corresponding to the said one second axis light to an on state such that light remains confined in the said first axis along the length of the body and alternately switching one of the other of the plurality of features in to an on state such that light transits on passing the location of the twist from the said first axis to a second axis corresponding to the said one other of the plurality of features.

According to a seventh aspect, the invention provides an optical signal processor including an orientation switchable optical fibre switched according to a fifth or sixth aspect of the invention.

According to an eighth aspect, the invention provides an optical communications system including an orientation switchable optical fibre switched according to a fifth or sixth aspect of the invention or a processor according to a seventh aspect of the invention.

DESCRIPTION OF THE INVENTION

Figure 1:
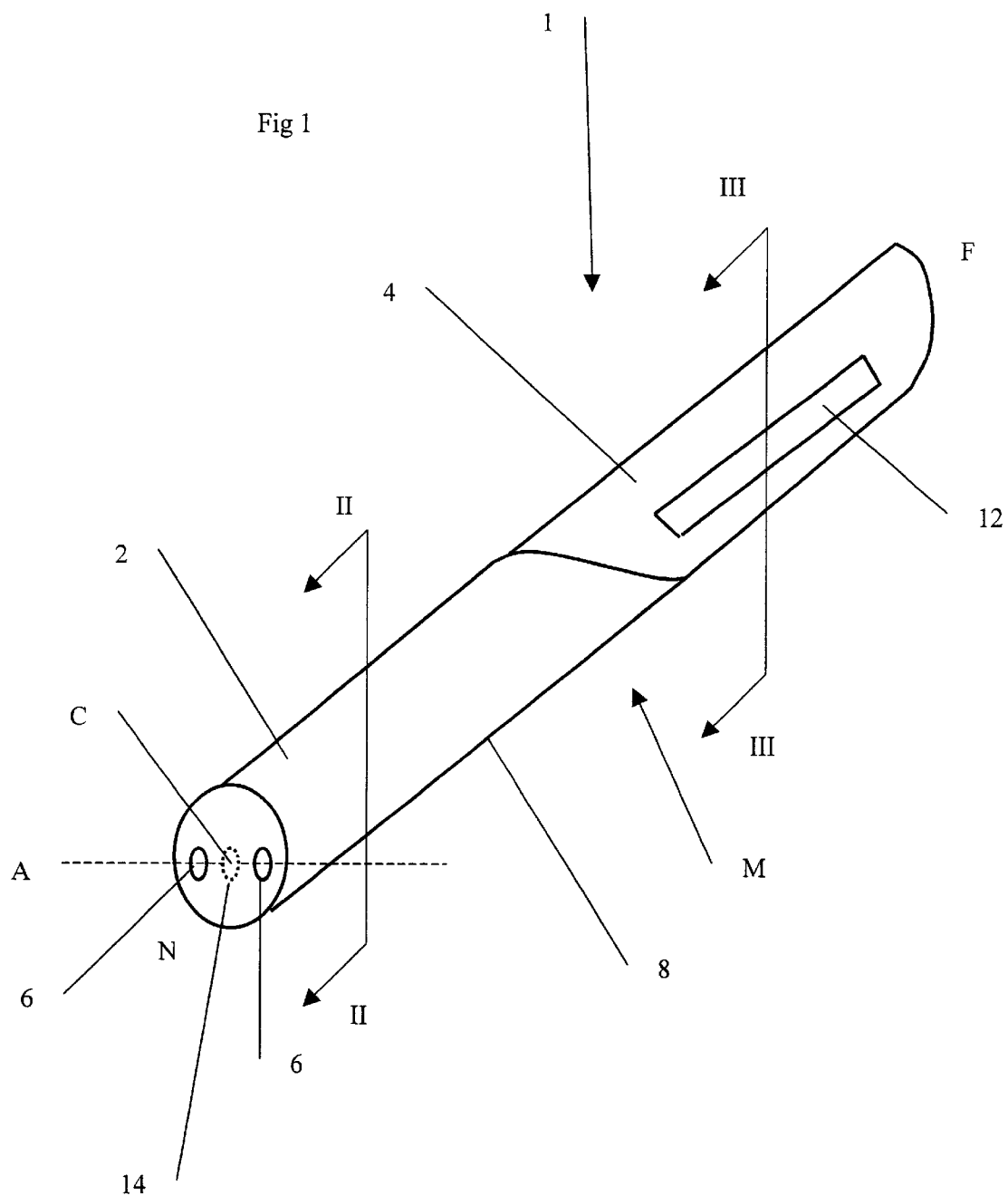
FIG. 1 is a perspective view of an orientation switchable optical fibre according to the invention.
Figure 2:
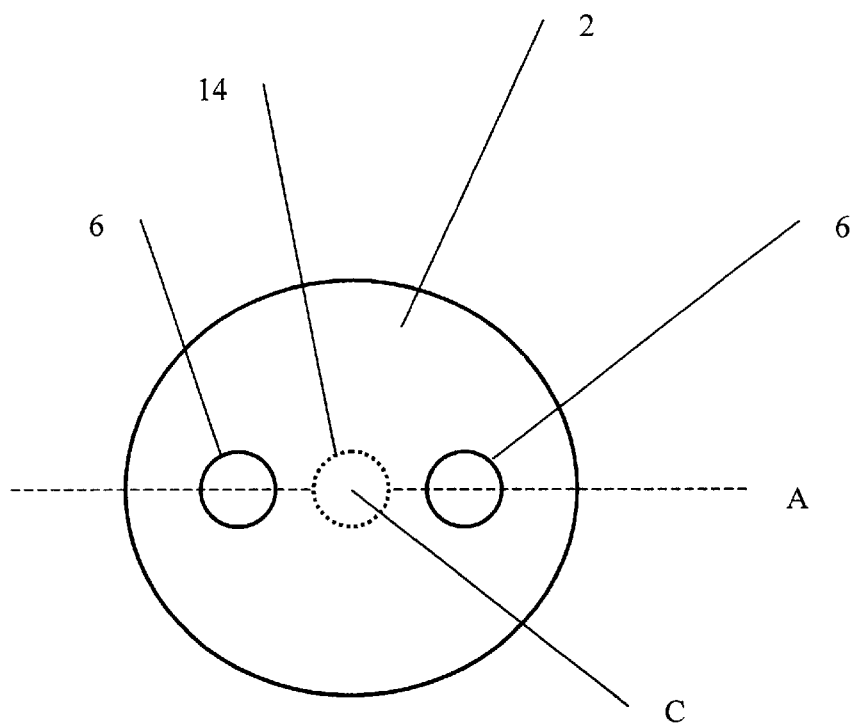
FIG. 2 is a cross sectional view taken along the line II—II in FIG. 1.
Figure 3:
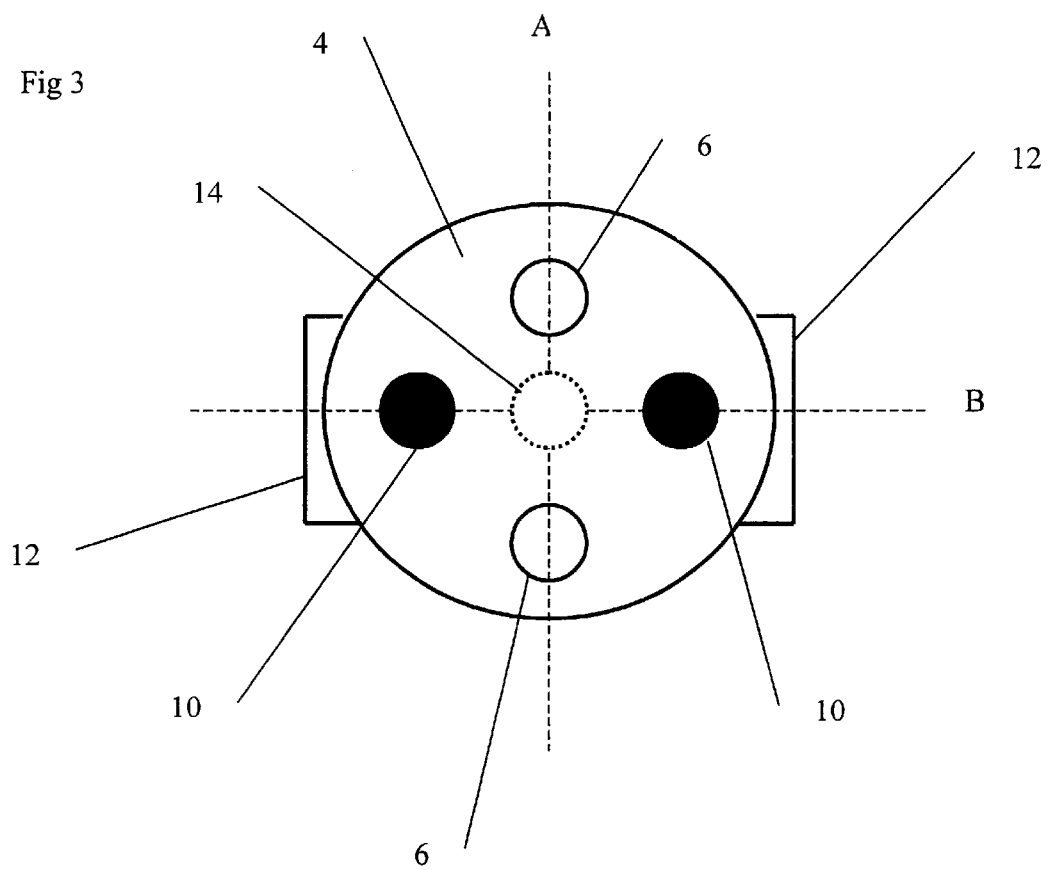
FIG. 3 is a cross sectional view taken along the line III—III in FIG. 1.

With reference to FIGS. 1 to 3, an orientation switchable optical fibre according to the invention indicated generally at 1 comprises an elongate optical fibre body 8, twisted through 90° at its longitudinal midpoint M, effectively dividing the body 8 into two halves 2, 4, each of several meters in length. The body 8 is of doped silica material.

The body 8 has a near end N and a far end F, and a transverse centre C. Extending along the whole length of the body 8, through both halves 2, 4, from the near end N to the far end F, are two cylindrical air channels 6 of several microns in diameter. These constitute the passive means having one feature according to the invention. The two channels 6 are diametrically opposed, each spaced radially apart from the centre C. The channels 6 thereby define a first transverse, diametrical axis A.

The channels 6 have the effect of reducing the effective refractive index of the body material in the axis A. The material between the channels 6 provides a central defect which acts as a core region 14. In other words, the channels 6 promote orientation of light in the axis A. Effectively, the channel 6/core region 14 combination behaves in the passive state of the switch 1 in the manner of a solid core PCF or holey fibre.

The air channels 6 follow the twist so that their axis of orientation rotates through by 90° at the midpoint M of the body 8. For example, as shown in FIG. 1 at the near end N the axis A is horizontal but, at the far end F, the axis A is vertical.

Within the second half 4 of the body 8, two cylindrical quartz silica rods 10, each several microns in diameter, extend from midpoint M to the far end F. The rods 10 constitute the active means having one feature according to the invention. As with the air channels 6, the rods 10 are diametrically opposed, each spaced radially apart from the centre C, but the rods 10 are offset by 90° from the air channels 6. The rods 10 thereby define a second transverse, diametrical axis B which is orthogonal to the axis A.

Opposite each of the rods 10, on the outer cylindrical surface of the body 8 resistive heating elements 12 are applied. By switching on and off an electrical supply (not shown), the application of current to each element 12 causes them to radiate thereby raising the temperature of the rods 10. The material from which the rods 10 are made, quartz silica, is thermally stressable material. That is to say, in the unheated state, the "off" state, the stress in the rods 10 is such that the refractive index of the core 12 along the axis B is unaffected. However, the stress in the rods 10 is temperature dependent and, when they are heated, the "on" state, they exert stress along the axis B. This stress has the effect of raising the refractive index of the core region 14 in the axis B. The rise in refractive index is such that the step change in refractive index between the core region 14 and the body material in the axis B is greater than the step in the refractive index in the axis A.

In use, light is launched into the near end N of the body 8. The air channels 6 promote the corresponding axis A as a preferred orientation for light entering the body, and light which is oriented along the axis A is confined to the axis A. Light orientated in any other axis is not confined and escapes from the body 8. Thus light is confined within the first half 2 of the body 8 in the core region 14 in a horizontal orientation or polarisation. In the passive state of the switch 1, when the rods 10 are off and not stressed, the light as it passes the twist 7 at the midpoint M will tend to follow the orientation of confinement and will rotate through 90° along with the air channels 6 so as to appear at the far end of the fibre 1 still oriented along the diametrical axis A of the air channels 6 but now vertically rather than horizontally polarised. In the active state of the switch 1, when the rods 10 are switched on and stressed, the light as it passes the twist at the midpoint M will initially tend to follow the orientation of confinement but, as it does so, it will "see" the relatively greater step in refractive index along the diametrical axis B of the rods 10. As a result, the light will transit to the preferred greater step index axis B; in other words, from the orientation of the air channels 6 into the orientation of the rods 10. The light will then be confined in the corresponding axis B and will remain there until it appears at the far end F of the fibre 8 now horizontally polarised.

Figure 4:
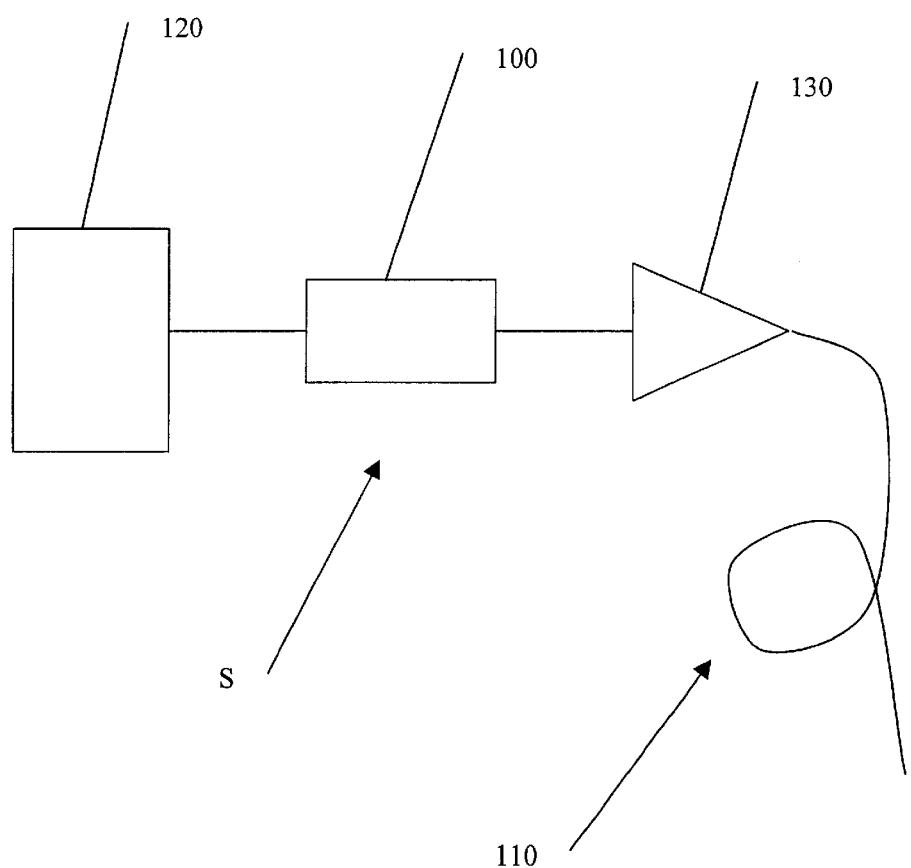
FIG. 4 is a schematic block diagram of a communications system including an orientation switchable optical fibre according to the invention.

An orientation switchable optical fibre as described with reference to FIGS. 1 to 3 may be utilised, for example, in a bit interleaving process. With further reference to FIG. 4, an optical communications system indicated generally at S has an orientation switchable optical fibre 100 situated at the head of an optical fibre span 110. Incoming signal pulses from a transmitter 120 of the system S are orientated in the first transverse, diametrical axis A of the fibre 100. The pulses are separated within the fibre 100 by switching the active means so as to cause alternate bits to assume orthogonal orientations, that is, a first bit remains in axis A, a second bit transits to the second, diametrical axis B, a third bit remains in axis A, and so on. The switching may be achieved quickly by using electrical techniques. The signal from the fibre 100 is amplified at the amplifier 130 before being set along the span 110. This technique makes for a system more robust to non-linearities and can allow polarisation demultiplexing at a receiver.

What is claimed is:

1. An orientation switchable optical fibre comprising an elongate body having two ends, which body is twisted intermediate the two ends, a central core region in which light carried by the fibre is confined, passive means extending substantially from one end to substantially the other end of the body, which passive means promotes orientation of light in at least one first transverse axis of the body, active means extending substantially from the location of the twist to substantially the other end of the body, which active means is switchable between an off state in which the active means is ineffective and an on state in which the active means is effective to promote orientation of light in at least one second transverse axis of the body, wherein in the off state of the active means light remains confined in the at least one first axis along the length of the body and in the on state of the active means light transits as on passing the location of the twist from the first axis to the at least one second axis.

2. A fibre according to claim 1 wherein the body is substantially circular in cross section and each transverse axis is a diametrical axes.

3. A fibre according to claim 1 wherein there is only one first axis and one second axis, and the first and second axes are substantially orthogonal.

4. A fibre according to claim 1 wherein the passive means comprises a feature which reduces the effective refractive index of the body material surrounding the core region such that there is a step change in refractive index between the core region and the surrounding body material in the first axis.

5. A fibre according to claim 4 wherein the feature comprises air channels.

6. A fibre according to claim 5 wherein the feature comprises a pair of air channels, spaced apart to either side of the core region thereby to define the first transverse axis.

7. A fibre according to claim 1 wherein the passive means comprises a plurality of features each promoting orientation of light in one first transverse axis of the body.

8. A fibre according to claim 1 wherein the active means comprises a switchable feature which is switchable between an off state in which it has no effect on the refractive index of the core region and an on state in which it has an effect on the refractive index of the core region in the second axis.

9. A fibre according to claim 8 wherein the effect is an increase in the refractive index of the core region.

10. A fibre according to claim 9 wherein the increase is such that such that the step change in the refractive index between the core region and the surrounding body material in the second axis is greater than a step change in the refractive index in the first axis.

11. A fibre according to claim 8 wherein the switchable feature comprises rods of material.

12. A fibre according to claim 11 wherein the switchable feature comprises a pair of rods of material, spaced apart to either side of the core region thereby to define the second transverse axis.

13. A fibre according to claim 11 wherein the rods are switchable between an off state in which the rods are unstressed and an on state in which the rods are stressed thereby to affect the refractive index of the core region.

14. A fibre according to claim 13 wherein the stress is applied by means of heat, electricity or mechanical force.

15. An optical signal processor including an orientation switchable optical fibre according to claim 14.

16. An optical communications system including a signal processor according to claim 15.

17. An optical communications system including an orientation switchable optical fibre according to claim 14.

18. A fibre according to claim 1 wherein the active means comprises a plurality of features each promoting orientation of light in one second transverse axis of the body.

19. A fibre according to claim 1 wherein the active means extends along the whole length of the body such that, according to the state of the active means, there are two possible orientations for light along the whole length of the fibre with switching between each facilitated.

20. An optical communications system including an orientation switchable optical fibre according to claim 1.

21. An orientation switchable optical fibre comprising an elongate body having two ends, which body is twisted intermediate the two ends, a central core region in which light carried by the fibre is confined, passive means extending substantially from the first end of the body to substantially the location of the twist, which passive means promotes orientation of light in at least one first transverse axis of the body, active means extending substantially from the location of the twist to substantially the second end of the body, which active means has a plurality of features each switchable between an off state in which the feature is ineffective and an on state in which the feature is effective to promote orientation of light in a corresponding second transverse axis of the body, wherein one of the second transverse axes is substantially aligned with a first of the first transverse axes and wherein in the on state of the one of the plurality of features corresponding to the said one of the second axes light remains confined in the said first axis along the length of the body and in the on state of the one of the other of the plurality of features light transits on passing the location of the twist from the said first axis to a second axis corresponding to the said one other of the plurality of features.

22. An optical signal processor including an orientation switchable optical fibre according to claim 1.

23. An optical communications system including a signal processor according to claim 22.

24. An optical communications system including an orientation switchable optical fibre according to claim 21.

25. An optical signal processor including an orientation switchable optical fibre according to claim 21.

26. An optical communications system including an orientation switchable optical fibre according to claim 25.

27. A method of switching light orientation in an optical fibre comprising an elongate body having two ends, which body is twisted intermediate the two ends, a central core region in which light carried by the fibre is confined, passive means extending substantially from one end to substantially the other end of the body, which passive means promotes orientation of light in at least one first transverse axis of the body, active means extending substantially from the location of the twist to substantially to the other end of the body, which active means is switchable between an off state in which the active means is ineffective and an on state in which the active means is effective to promote orientation of light in at least one second transverse axis of the body, the method comprising switching the active means between the off state in which light remains confined in the at least one first axis along the length of the body and the on state in which light transits on passing the location of the twist from the at least one first axis to the at least one second axis.

28. A method according to claim 27 wherein the active means extends along the whole length of the body such that, according to the state of the active means, there are two possible orientations for light along the whole length of the fibre with switching between each facilitated.

29. An optical communications system including an orientation switchable optical fibre switched by a method according to claim 27.

30. An optical signal processor including an orientation switchable optical fibre switched by a method according to claim 27.

31. A method of switching light orientation in an optical fibre comprising an elongate body having two ends, which body is twisted intermediate the two ends, a central core region in which light carried by the fibre is confined, passive means extending substantially from the first end of the body to substantially the location of the twist, which passive means promotes orientation of light in at least one first transverse axis of the body, active means extending substantially from the location of the twist to substantially the second end of the body, which active means has a plurality of features each switchable between an off state in which the feature is ineffective and an on state in which the feature is effective to promote orientation of light in a corresponding transverse axis of the body, wherein one of the second transverse axes is substantially aligned with a first of the first transverse axes, the method comprising switching one of the plurality of features corresponding to the said one second axis light to an on state such that light remains confined in the said first axis along the length of the body and alternately switching one of the other of the plurality of features in to an on state such that light transits on passing the location of the twist from the said first axis to a second axis corresponding to the said one other of the plurality of features.

32. An optical signal processor including an orientation switchable optical fibre switched by a method according to claim 31.

33. An optical communications system including an orientation switchable optical fibre switched by a method according to claim 31.

* * * * *